US005185050A

United States Patent [19]

Sakamoto et al.

[11] Patent Number: 5,185,050

[45] Date of Patent: Feb. 9, 1993

[54] APPARATUS FOR CUTTING OPPOSED IRREGULARLY SHAPED ENDS OF VENEERS AND BONDING THE VENEERS TOGETHER AT INCLINED END FACES THEREOF FORMED BY THE CUTTING OF THE OPPOSED IRREGULARLY SHAPED ENDS

[75] Inventors: Shinichi Sakamoto, Ohbu; Kenichi Hiraiwa, Nagoya; Masaru Koike, Ichinomiya; Yoshioki Nozawa, Nishio, all of Japan

[73] Assignee: Meinan Machinery Works, Inc., Ohbu, Japan

[21] Appl. No.: 795,525

[22] Filed: Nov. 21, 1991

[30] Foreign Application Priority Data

Nov. 28, 1990 [JP] Japan .................................. 2-331791

[51] Int. Cl.[5] .............................................. B29C 65/00

[52] U.S. Cl. ................................ 156/304.5; 144/345; 156/303; 156/502

[58] Field of Search ............... 156/159, 258, 558, 303, 156/304.1, 304.5, 502; 144/344, 345

[56] References Cited

U.S. PATENT DOCUMENTS

| | | | |
|---|---|---|---|
| 3,562,045 | 2/1971 | Hasegawa | 156/304.5 |
| 3,854,357 | 12/1974 | Kron | 156/159 |
| 4,042,440 | 8/1977 | Hasegawa et al. | 156/558 |
| 4,510,009 | 4/1985 | Takagi | 156/159 |

FOREIGN PATENT DOCUMENTS

| | | |
|---|---|---|
| 1528121 | 9/1970 | Fed. Rep. of Germany . |
| 2062363 | 9/1970 | France . |
| 51-46498 | 4/1976 | Japan . |
| 49119757 | 4/1976 | Japan . |
| 48122461 | 6/1982 | Japan . |

*Primary Examiner*—W. Donald Bray
*Attorney, Agent, or Firm*—Lahive & Cockfield

[57] ABSTRACT

An apparatus for cutting opposed irregularly shaped ends of veneers to produce opposed inclined end faces and for bonding the veneers together at the inclined end faces thereof, has a cutter which cuts an irregularly shaped end of a veneer to produce an end face inclining from an upper edge to a lower edge a little ahead of the upper edge. The apparatus also has an adhesive-material supplying device with outlets from which an adhesive material is projected. The outlets are located substantially directly above, and in immediate proximity to, an inclined front end face of a following veneer on a first support member. When a second support member is pivoted to bring an inclined rear end face of a preceding veneer thereon into contact with the inclined front end face of the following veneer, the inclined rear end face of the preceding veneer picks off the adhesive material projected from the outlets of the adhesive-material supplying device immediately before coming into contact with the inclined front end face of the following veneer.

6 Claims, 9 Drawing Sheets

APPARATUS FOR CUTTING OPPOSED IRREGULARLY SHAPED ENDS OF VENEERS AND BONDING THE VENEERS TOGETHER AT INCLINED END FACES THEREOF FORMED BY THE CUTTING OF THE OPPOSED IRREGULARLY SHAPED ENDS

FIELD OF THE INVENTION

This invention relates to an apparatus for cutting opposed irregularly shaped ends of veneers and bonding the veneers together at their inclined end faces, which were formed by removing their opposed irregularly shaped ends.

BACKGROUND OF THE INVENTION

In Japanese Patent Application No. 48-122461 (published under No. 57-17682) the applicant has proposed an apparatus for cutting opposed irregularly shaped ends of veneers and bonding the veneers together at their flat end faces formed by the cutting of the irregularly shaped ends. In this apparatus a veneer is conveyed onto a main roller, and its opposed irregularly shaped ends are cut to produce opposed flat end faces. Then, the veneer is conveyed onto a veneer supporting member provided for pivotal movement. The rear end portion of the veneer on the veneer supporting member is lightly pressed by a pressing roller provided in conjunction with the veneer supporting member. Thereupon, the rear end of the veneer on the veneer supporting member is raised to a middle position. Then, a front irregularly shaped end of a second veneer is conveyed beneath the cutter. At the same time the rear end of the preceding veneer on the veneer supporting member is raised to a highest position adjacent an adhesive material applying roller on which a thermoplastic adhesive material is applied in advance. When it reaches the highest position, the upper surface of the veneer is coated with the adhesive material from the adhesive-material applying roller. The adhesive material is thus applied to the upper surface of the rear end portion of the preceding veneer. Then, the front irregularly shaped end of the second veneer is cut to produce a flat front end face. Thereupon, the rear end of the preceding veneer is lowered to bring the flat rear end face of the preceding veneer into contact with the flat front end face of the second veneer. Thereupon, the main roller is restarted to move the two veneers forward. Thus, the adhesive material on the upper surface of the rear end portion of the preceding veneer is spread on to the upper surface of the front end portion of the second veneer by the pressing roller. The adhesive material thus is also applied to the upper surface of the front end portion of the second veneer to bond the two veneers together. Then, a rear irregularly shaped end of the second veneer is also cut to prepare to bond the second veneer to a third veneer.

A principal drawback of the foregoing apparatus is that the adhesive material is applied not to the flat rear end face of the first veneer or the flat front end face of the second veneer, but to the upper surfaces of the rear end portion of the first veneer and of the front end portion of the second veneer. Therefore, the bond between the veneers is not very strong. In particular, the thicker the veneers, the weaker the bond. Another drawback is that the position where the veneers are brought into contact with each other is rather distant from the position where the adhesive material (a thermoplastic adhesive) has been applied to the first veneer and, hence, the adhesive material applied to the first veneer may start to set, due to natural cooling, before the first veneer contacts the second veneer. If setting occurs early, the first veneer does not adhere well to the second veneer.

The inventors are also aware of Japanese Patent Application No. 49-119757 (published under No. 51-46498) which discloses a similar apparatus to the one described above. In this apparatus a veneer is conveyed beneath a cutter, and its opposed irregularly shaped ends are cut to produce opposed flat end faces. The veneer is received on a veneer supporting member. Thereupon, the rear end of the veneer is raised to a position close to a pivotable adhesive-material applicator. Then, the applicator is pivoted to apply an adhesive material to the flat rear end face of the veneer. Thereupon, a second veneer is conveyed, and its front irregularly shaped end is cut to produce a flat front end face. Then, the rear end of the preceding veneer is lowered to bring the flat rear end face of the preceding veneer into contact with the flat front end face of the second veneer. The two veneers are thus bonded.

A major difference between the first and second apparatus is that in the first apparatus the adhesive material is applied to the upper surface of the rear end portion of the first veneer and the upper surface of the front end portion of the second veneer, whereas in the second apparatus the adhesive material is applied to the flat rear end face of the first veneer. However, with the second apparatus, much of the adhesive material applied to the flat rear end face of the first veneer is quite likely to be removed when it contacts the front upper edge of the second veneer when the flat rear end face of the first veneer is lowered to contact the flat front end face of the second veneer. This is because the flat end faces of the veneer are "straight", or are at right angles to the upper and lower surfaces thereof. This is a major drawback of the second apparatus. In addition, the second apparatus has the same drawback as the first apparatus, i.e., that the position where the veneers are brought into contact with each other is rather distant from the position where the adhesive material has been applied to the first veneer. Another drawback of the second apparatus is that the adhesive-material applicator is not fixed, but is turned when an adhesive material is to be applied to the veneer. It makes the entire apparatus rather complex.

SUMMARY OF THE INVENTION

It is an object of the invention to provide an apparatus for cutting opposed irregularly shaped ends of veneers and for bonding the veneers together at the flat end faces formed by the cutting of their opposed irregularly shaped ends, whereby an irregularly shaped end of a veneer is cut at an angle to produce an inclined end face where the lower edge of the veneer is longer than the upper edge.

Another object of the invention is to provide such an apparatus whereby an adhesive material is applied to an inclined rear end face of a preceding veneer, and the adhesive material is not removed by a front upper edge of a following veneer (to be bonded to the preceding veneer) when the inclined rear end face of the preceding veneer is brought into contact with an inclined front end face of the following veneer.

Still another object of the invention is to provide such an apparatus whereby an adhesive material is applied in a position which is in immediate proximity to the position where the veneers are to be bonded.

DETAILED DESCRIPTION OF A PREFERRED EMBODIMENT

Figure 1:
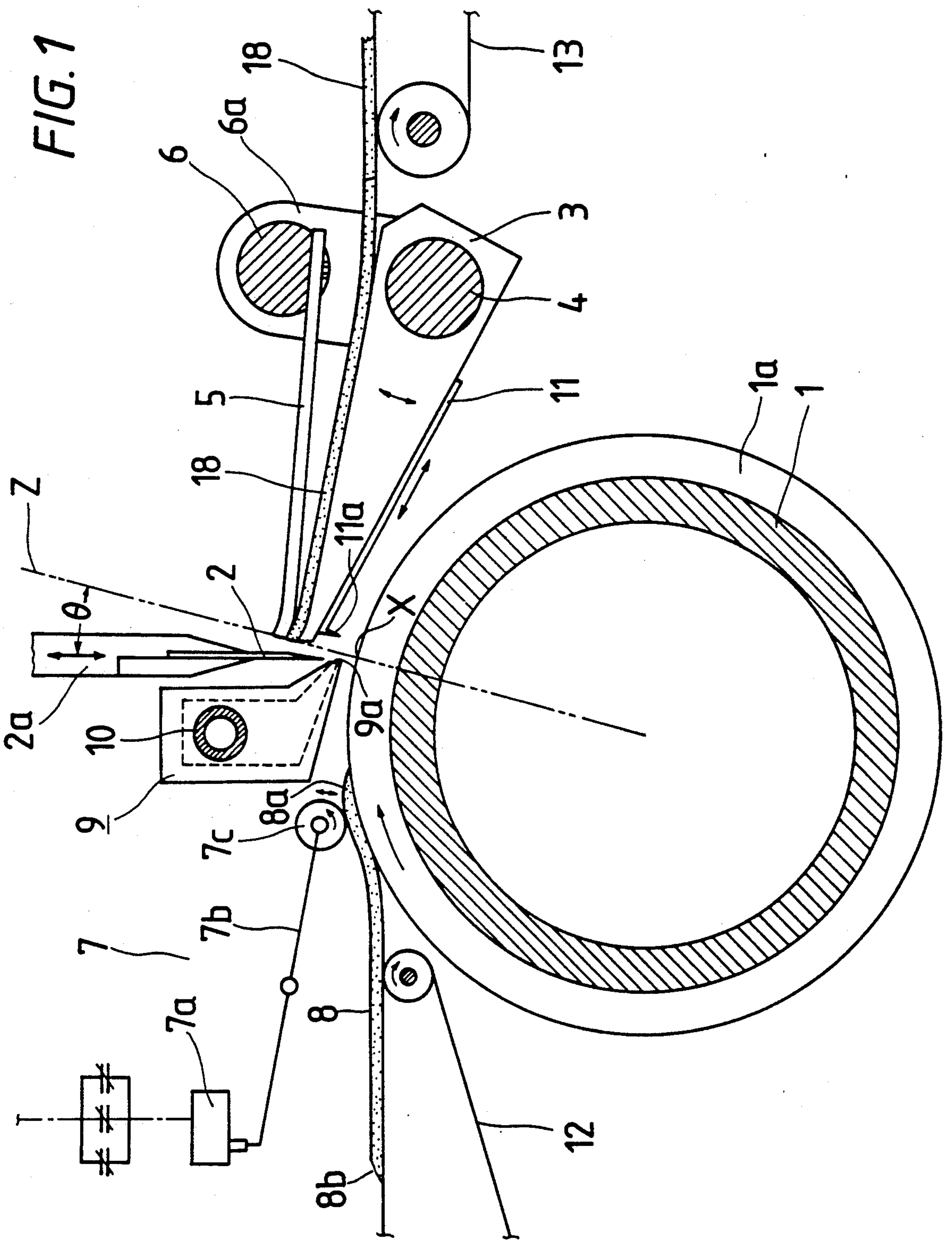
FIG. 1 is a side view of an apparatus of the invention.

An apparatus which embodies the invention in one preferred form will now be described in detail with reference to the drawing.

Referring to FIG. 1, the apparatus of the invention includes an anvil roller 1. Although only one recess 1*a* is shown in FIG. 1, the anvil roller 1 is provided with plural circumferential recesses la which are spaced apart from each other along the axial direction of the roller 1. The roller 1 is rotated clockwise (see FIG. 1) by an operating mechanism (not shown) such as a servomotor. A veneer 8 conveyed by a conveyer 12 rides on the roller 1 and is further conveyed thereby until the veneer 8 reaches a predetermined position which will be described later.

Above the roller 1, a cutter 2 is held by a vertically movable cutter holder 2*a*. The cutter 2 is located in a plane which passes a fixed position X on the anvil roller 1 and makes a given angle $\theta$ with an inclined plane Z extending from the center of the roller 1 and passing through the fixed position X. The fixed position X on the roller 1 is fixed in a position relative to cutter 2 and is not changed by the rotation of the roller 1.

Although only one veneer supporting member 3 is shown in FIG. 1, plural veneer supporting members 3 are provided in conjunction with the respective recesses 1*a* of the roller 1. That is, each veneer supporting member 3 is aligned with a recess la to allow each veneer supporting member 3 to interfit within each recess 1*a*, as will be described below. All the veneer supporting members 3 are fixed to a common rotatable shaft 4, and are located such that the left-hand end (in FIG. 1) of each veneer supporting member 3 can be moved into the associated recess 1*a*.

A rod 6 is located above the shaft 4, and is parallel to the latter 4. Although only one connecting member 6*a* is shown, two opposed connecting members 6*a* are provided. One connecting member 6*a* connects the ends of the shaft 4 and of the rod 6 located on the same side, while the other connecting member 6*a* connects the opposed ends of the shaft 4 and of the rod 6. The shaft 4, the connecting members 6*a*, and the rod 6 are pivotable as one body. A veneer holder 5 is provided in conjunction with each veneer supporting member 3, and has a right end portion fixed into a lower opening of the rod 6. The veneer holder 5 may be a leaf spring. When the shaft 4 is rotated, the left ends (in FIG. 1) of the veneer supporting member 3 and of the veneer holder 5 simultaneously move downward or upward.

Although only one veneer detecting mechanism 7 is shown in FIG. 1, plural veneer detecting mechanisms 7 are provided. The veneer detecting mechanisms 7 are spaced apart from each other along the direction of the axis of the roller 1. Each veneer detecting mechanism 7 comprises a veneer detector 7*a*, a swing arm 7*b*, and a roller 7*c*. The veneer detector 7*a* chiefly comprises a phototube and a limit switch (not shown).

A device 9 for supplying an adhesive material is located above the roller 1. The device 9 is a fixed one. The device 9 has plural outlets 9*a* spaced apart from each other along the direction of the axis of the roller 1. From each outlet 9*a* is projected only a small amount of adhesive material at one time. Each outlet 9*a* is circular or oval in its shape, and is located directly above the fixed position X on the roller 1. A control valve (not shown) may be provided either in a conduit 10 through which the adhesive material is introduced into the device 9 or in the device 9. If desired, plural adhesive-material supplying device spaced apart from each other along the direction of the axis and each having an outlet may be provided instead of the single device 9.

The veneer supporting member 3 is provided with a veneer remover 11 movable on the bottom of the veneer supporting member 3.

Figure 2:
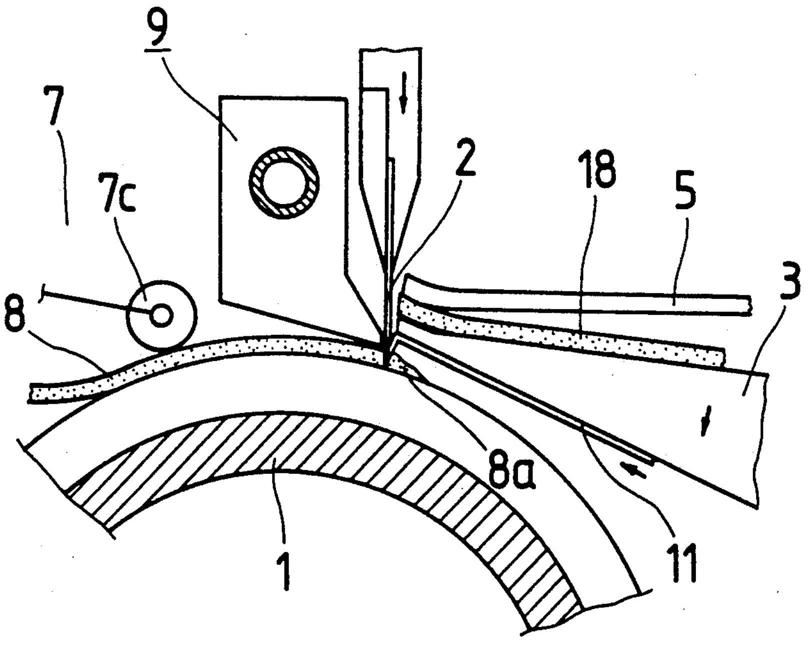
FIGS. 2 to 6 illustrate the operation of the apparatus.
Figure 3:
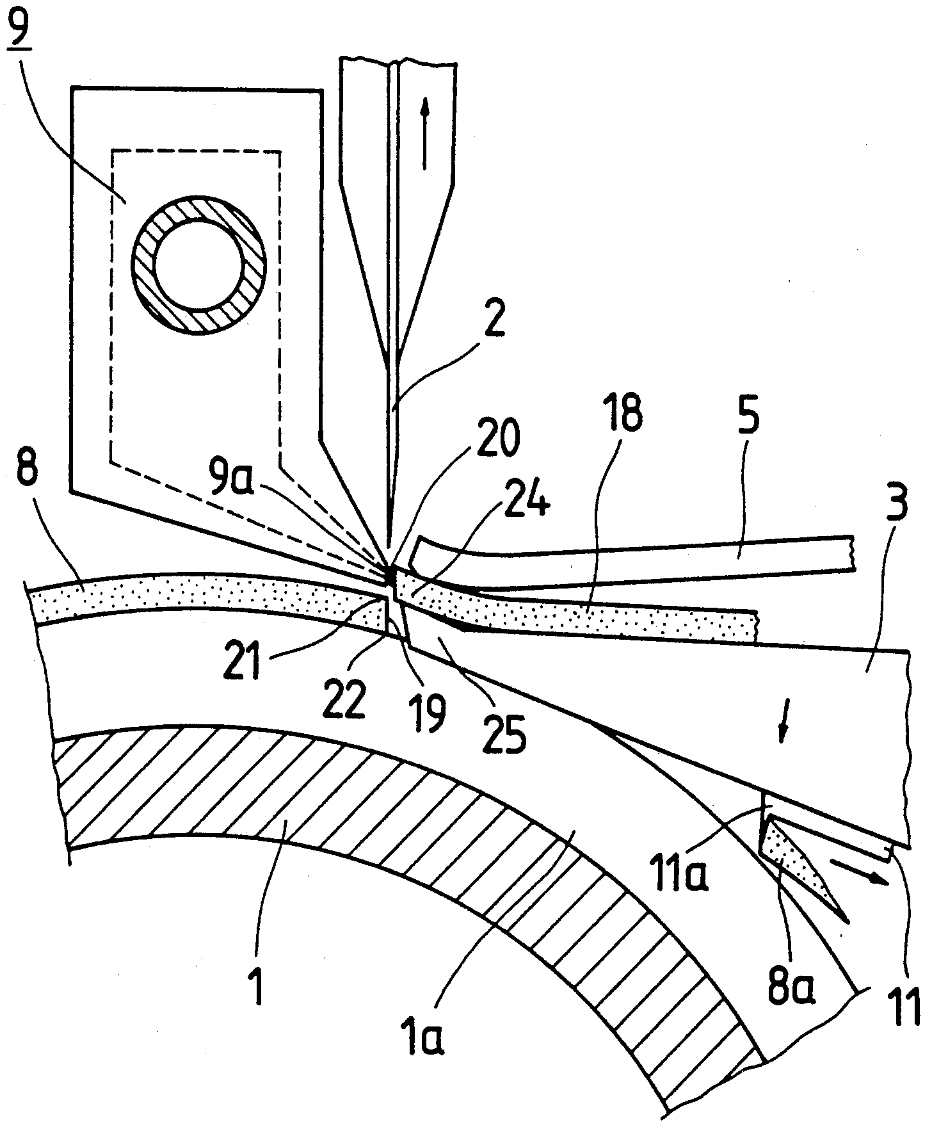

The operation of the apparatus with the foregoing construction will now be described. Referring to FIG. 1, a veneer 8 having opposed irregularly shaped ends 8*a* and 8*b* and orientated such that the fibers of the veneer 8 extend in a direction perpendicular to the direction of conveyance thereof, is conveyed by the conveyer 12, and rides on the anvil roller 1 which is rotating. The veneer 8 is thus conveyed to the right(as shown in the Figures) by both the conveyer 12 and the roller 1. Thereupon, the regularly-shaped portion of veneer 8, as opposed to the irregularly shaped end 8*a*, comes into engagement with the roller 7*c* of the veneer detecting mechanism 7. The veneer 8 is thus detected by the veneer detecting mechanism 7. When a predetermined portion of the veneer 8, from at which its irregularly shaped front end 8*a* is to be cut, reaches the fixed position X on the roller 1, both the conveyer 12 and the roller 1 are stopped. Thereupon the cutter 2 is moved downward to cut the front irregularly shaped end 8*a* from the veneer 8 (FIG. 2). Thus, the cutter 2 cuts into the veneer 8 at the angle $\flat$ with plane Z and produces a front end face 19 inclining from an upper edge 21 to a lower edge 22 a little ahead of the upper edge 21 (FIG. 3). In other words, the cutter 2 produces an inclined front end face 19 making an obtuse angle with the upper surface of the veneer 8 and making an acute angle with the lower surface thereof. After the front irregularly shaped end 8*a* has been cut, the left ends of all the veneer supporting members 3 are lowered at the same time until a hooked end 11*a* of each veneer remover 11 (associated with each veneer supporting member 3) enters the cut of the veneer 8 made by the cutter 2 (FIG. 2), while the cutter 2 is still in the veneer 8. Thereupon, the cutter 2 is raised, and the veneer remover 11 is retracted to remove the front irregularly shaped end 8*a* from the veneer 8. Then, a small amount of adhesive material 20 is projected from each outlet 9*a* of the device 9 at the same time.

As illustrated, a second veneer 18 is held by the veneer supporting members 3 and the veneer holders 5. The veneer 18 was treated by the cutter 2 at each end immediately before the veneer 8 and, therefore, has an inclined rear end face 24 inclining at the same angle as the flat front end face 19 of the veneer 8. The left end of the veneer holder 5 presses the veneer 18 lightly to hold it together with the supporting member 3.

Figure 4:
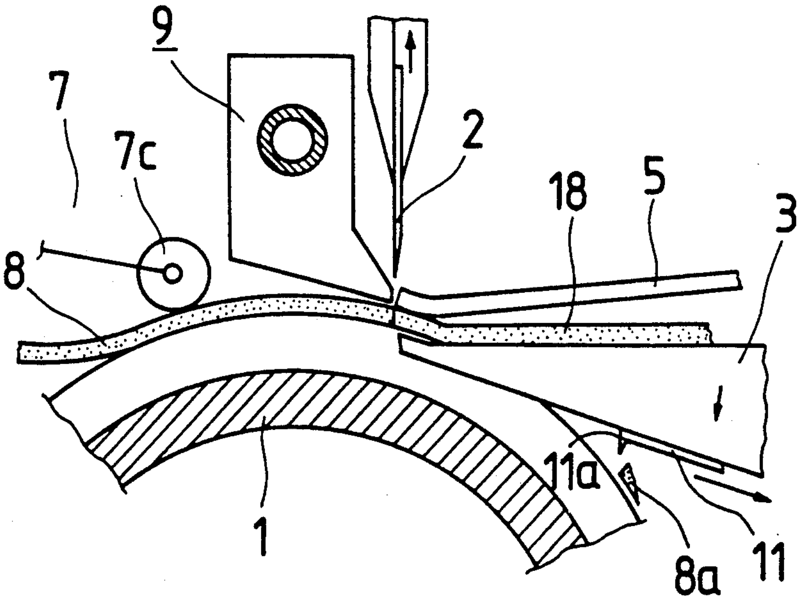

Immediately after the adhesive material 20 has been projected, the left end of the veneer supporting member 3 is further lowered (together with the veneer holder 5)

from the position of FIG. 2 to the position of FIG. 4. Before the left end thereof reaches the position of FIG. 4, however, the rear end face of the veneer 18, when passing by the outlets 9a of the device 9, receives adhesive material 20 projected from the outlets 9a (FIG. 3). The adhesive material 20 is thus applied to different portions of the rear end face 24 of the veneer 18. When the left end of the veneer supporting member 3 reaches the position of FIG. 4, the rear end face 24 of the veneer 18 contacts the complementary front end face 19 of the veneer 8 with the adhesive material 20 between (FIG. 4). The veneers 18 and 8 are thus bonded. In FIG. 4 the left end of the veneer supporting member 3 is shown resting in the recess 1a of the roller 1.

Figure 5:
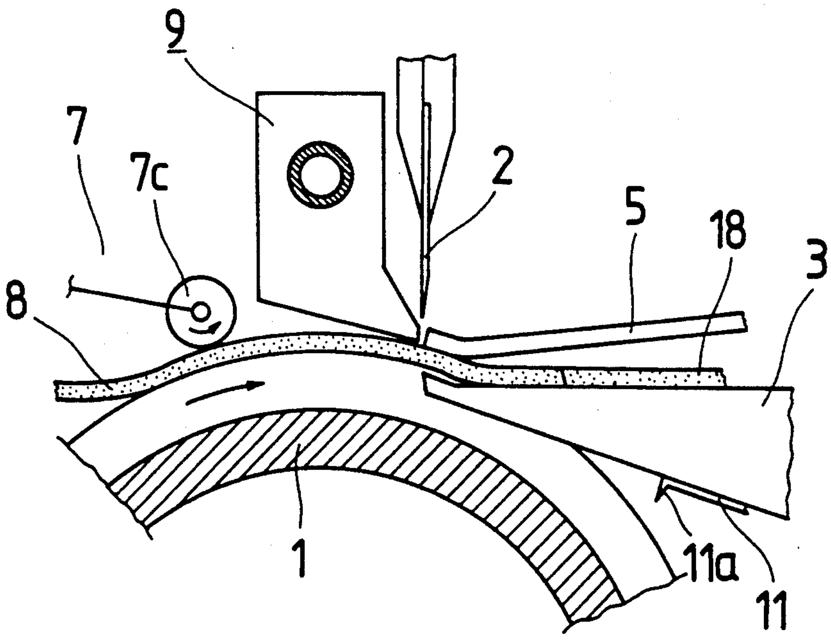
Figure 6:
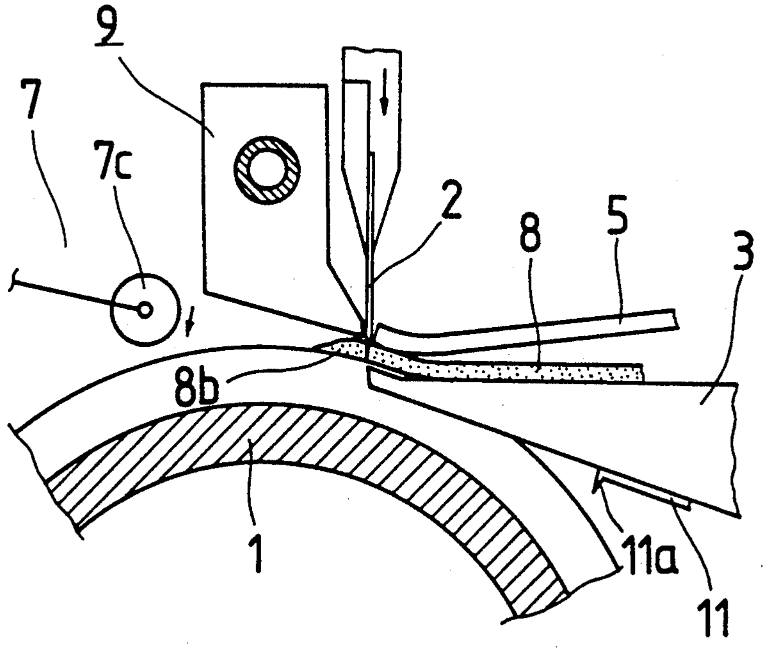

Thereupon, the roller 1 is restarted. Thus, as shown in FIG. 5, the veneers 8 and 18 bonded together by the adhesive material 20 move to the right. When a predetermined portion of the veneer 8 at which its irregularly shaped rear end 8b is to be cut has reached the fixed position X on the roller 1, the roller 1 is stopped. Thereupon, the cutter 2 is again moved downward to cut the rear irregularly shaped end 8b of the veneer 8 (FIG. 6). Thus, the cutter 2 produces an inclined rear end face of the veneer 8 which forms an acute angle with the upper surface thereof and an obtuse angle with the lower surface thereof.

After the rear irregularly shaped end place is removed, the cutter 2 is raised, and the supporting member 3, supporting the veneer 8, is returned to the position of FIG. 1, and waits for a next veneer (not shown) to be conveyed. When a next veneer has been conveyed, its front irregularly shaped end is cut to produce an inclined front end face to be bonded to the veneer 8 in the same manner as described above.

The irregularly shaped rear end 8b remaining on the roller 1 naturally drops when the roller 1 is restarted.

A number of veneers each having opposed irregularly shaped ends can be bonded together in this manner.

According to the invention, as described above, an irregularly shaped end of a veneer is cut to produce an end face inclining from an upper edge to a lower edge a little ahead of the upper edge. Thus, when the rear end face 24 of a preceding veneer 18 passes by the outlets 9a of the device 9, the rear end face 24 picks off the adhesive material 20 projected from the outlets 9a. Put simply, when passing by the outlets 9a, the rear end face 24 rubs the projected adhesive material 20 and, hence, the latter 20 adheres to the former 24. Also, when the rear end face 24 comes into contact with the front end face 19 of a following veneer 8, much of the adhesive material 20 is not transferred to the front upper edge 21 of the following veneer 8 as happens in the apparatus described in earlier applications, but remains on the rear end face 24. This ensures that the two veneers are firmly bonded by the adhesive material.

As described above, the rear end face 24 contacts the front end face 19. This action, however, can also be expressed by saying that the rear end face 24 is "placed from above" on the front end face 19. The reason why such a placement occurs is because the front end face 19, by virtue of its direction of inclination, provides a surface supporting the rear end face 24. This prevents much of the adhesive material on the rear end face 24 from going against the front upper edge 21. However, if an irregularly shaped end of a veneer is cut to produce a "straight" end face, that is, an end face which is at right angles with the upper and lower surfaces of the veneer, then the rear lower edge of a preceding veneer picks off the projected adhesive material when the rear end of the preceding veneer passes by the outlets 9a, instead of the rear and face. In such a case, even if the rear end face of the preceding veneer succeeds in picking off the projected adhesive material for some reason or other, much of the adhesive material is applied to the front upper edge of the following veneer when the rear end face of the preceding veneer contacts the front end face of the following veneer. That is, much of the adhesive material on the rear end face of the preceding veneer is removed by the front upper edge of the following veneer.

The angle of inclination of the end face must not be too great. Otherwise, only the upper portion of rear end face 24 picks off the adhesive material projected from the outlets 9a. That is, if the angle is too great, the result is similar to that produced if the end faces are "straight". Experiments conducted by the inventors have shown that, with a relatively thin veneer, an angle of about 10 to 30 degrees produces a favorable result, while with a relatively thin veneer, an angle of about 5 to 20 degrees produces a favorable result.

Figure 8:
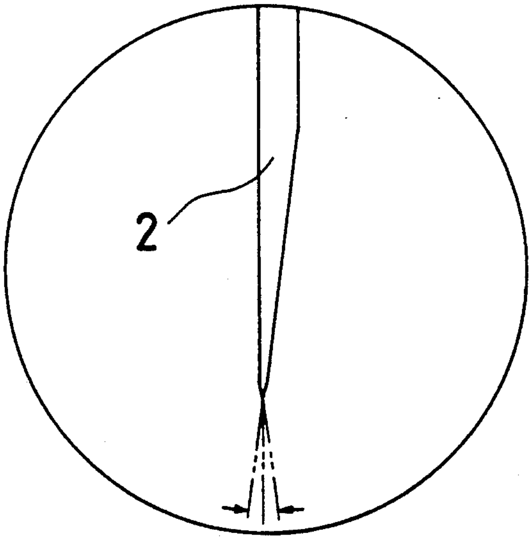
FIG. 8 is an enlarged view of the tip of a cutter.

With regard to cutter 2, it is desirable to use a cutter having two cutting edges at least in its tip (FIG. 8) rather than an entirely single-edged cutter.

Anvil roller 1 should preferably be coated with a suitable material such as rubber or synthetic resin to prevent it from being damaged by the cutter 2.

Figure 9:
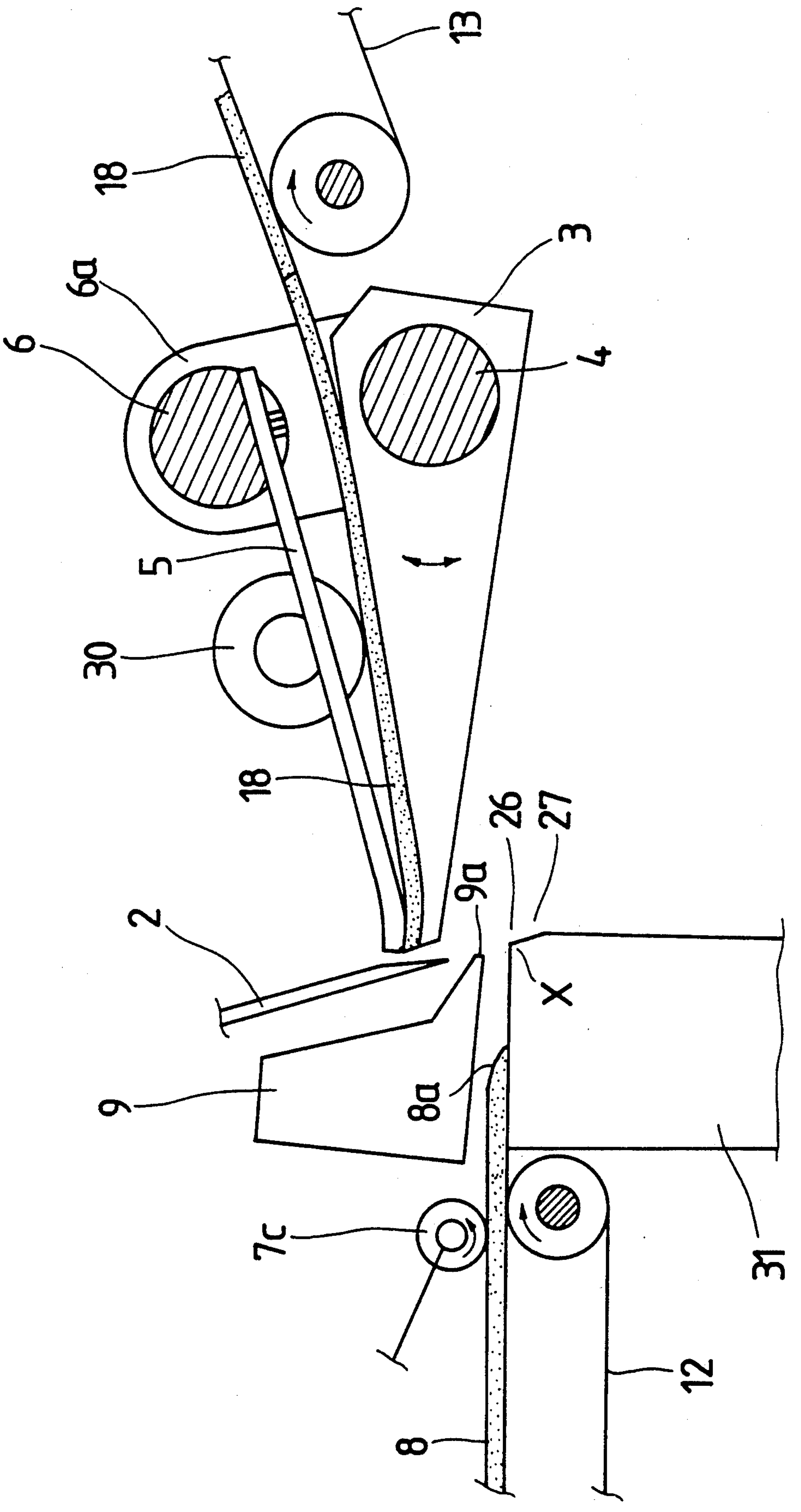
FIG. 9 shows another modification of the invention.

Also, in an alternative embodiment, a fixed, or unrotatable veneer support 31 may be used instead of the anvil roller 1, as shown in FIG. 9. As shown in FIG. 9, if such a veneer support 31 is used, it is necessary to change the position of the cutter 2. The veneer support 31 has a very keen edge 26 and an inclined face 27 extending downwardly from the edge 26 for a given distance. The keen edge 26 facilitates the cutting of an irregularly shaped end of a veneer by the cutter 2. That is, in this embodiment, the back face of the cutter 2 is located in virtually the same plane as the inclined face 27, while the keen edge 26 is located in such a position that the keen edge 26 is engaged by the tip of the cutter 2 and thus cuts an irregularly shaped end of the veneer in cooperation with the cutter 2 when the cutter 2 is moved downwardly. Following the cutting of the irregularly shaped end, the cutter 2 advances into the space on the inclined face 27. Also in this embodiment, a roller 30 is provided. After veneers 8 and 18 have been bonded, the roller 30 is operated (rotated) simultaneously with a conveyer 13 to convey the veneers to the right.

Figure 7:
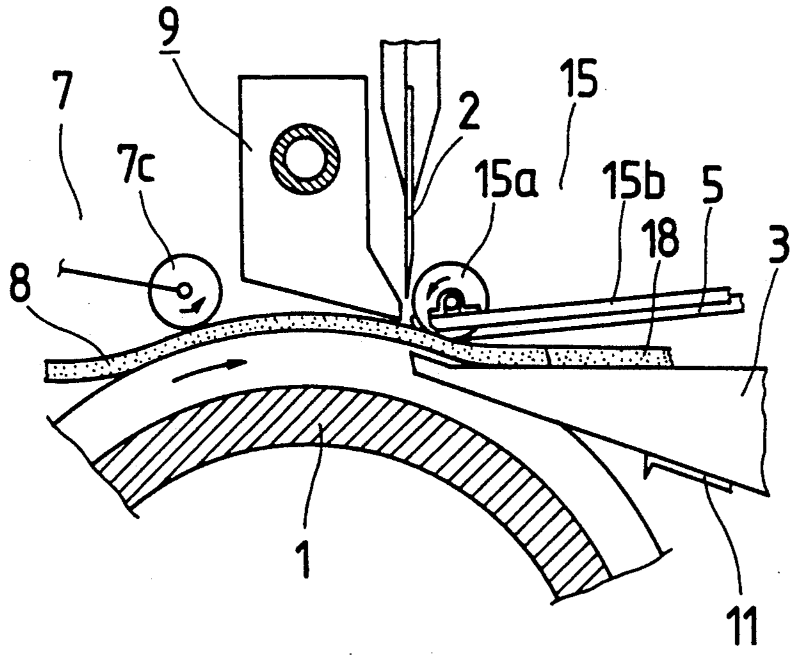
FIG. 7 shows a modification of the invention.

Veneer holder 5 should hold the preceding veneer 18 thereon with sufficient pressure to prevent the veneer 18 from moving on the veneer supporting member 3 until the veneer 18 has been bonded to the following veneer 8, and should allow the two veneers 18 and 8 to be moved on the veneer supporting member 3 after they have been bonded. Thus, as previously mentioned, the veneer holder 5 may be a leaf spring which lightly holds the rear end of the preceding veneer 18. However, if a leaf spring is used, it is desirable to coat the rear end thereof with chromium in such a manner that a hard surface is produced. if a hard surface is produced thereon, the friction between the leaf spring and the veneers is sufficiently reduced to allow the veneers to be moved smoothly on the veneer supporting member 3. Also, if necessary, another veneer holder 15 comprising a roller 15a and a leaf spring 15b may be provided in addition to the veneer holder 5 (FIG. 7).

For the invention, a thermoplastic or thermosetting adhesive material may be used. If a thermoplastic adhesive material is used, the left end of the veneer holder 5 can be cooled when it is holding the preceding veneer 18, as shown in FIG. 4. Cooling it at such a time facilitates setting of the adhesive material in the position X and aids the bonding of veneers 18 and 8. If a thermosetting adhesive material is used, the left end of the veneer holder 5 can be heated when it is holding the preceding veneer 18, as in FIG. 4, thereby facilitating the setting of the thermosetting adhesive material at position X.

Also, if a mechanism (not shown) is provided which applies remoistening adhesive tapes on the veneers 8 and 18 which have been bonded at position X, such that the adhesive tapes additionally connect the veneers 8 and 18, the veneers 8 and 18 can be conveyed (to the right) before the veneers 8 and 18 are completely bonded in the position X. This can increase the rate of treatment of veneers. For the same purpose, thread impregnated with a thermoplastic adhesive material may be used instead of remoistening adhesive tapes.

The veneer detecting mechanism 7 detects a veneer by engaging the regularly-shaped portion of the veneer. (As described before, to be more exact, the roller 7c engages the veneer.) In so doing, the detecting mechanism 7 detects the predetermined point on the veneer at which its irregularly shaped end (8a, 8b) is to be cut. Alternative detecting mechanisms can be used in the practice of this invention without departing from the spirit and scope of the invention. For example, instead of the illustrated detecting mechanism 7, a mechanism (not shown) can also be used which detects this point by the external shape of the veneer. Also, instead of using the illustrated detecting mechanism 7, marks can be placed in advance on the predetermined portions of the veneer at which its irregularly shaped ends (8a, 8b) are to be cut, and a mechanism (not shown) can be provided which detects the marks.

In the embodiment illustrated, the single adhesive-material supplying device 9 has plural outlets 9a. However, if desired, plural adhesive-material supplying devices spaced apart from each other along the direction of the axis of the roller 1 and each having an outlet may be provided instead of the single device 9.

As described, after being cut by the cutter 2, the front irregularly shaped end 8a is removed by the veneer remover 11. However, if desired, the veneer remover 11 may be omitted and instead pressurized air (not shown) may be used to blow the irregularly shaped end 8a off.

In the specification and claims the terms "an irregularly shaped end of a veneer" mean "an end of a veneer with no flat face".

What is claimed is:

1. An apparatus for cutting opposed irregularly shaped ends of veneers to produce opposed inclined end faces thereof and for bonding the veneers together at the inclined end faces thereof, which comprises (a) conveying means (12) for conveying a veneer (8) onto a first support means in such an orientation that the fibers of the veneer (8) extend in a direction perpendicular to a direction of conveyance thereof, (b) a first support means for supporting the veneer (8) for a required period of time, including a time during which its front irregularly shaped end (8a ) is cut and the veneer (8) is bonded to a preceding veneer (18), said first support means having a portion with which a cutter (2) engages when the cutter (2) has cut into the veneer (8), (c) detecting means (7) for determining when a first predetermined portion of the veneer at which its front irregularly shaped end (8a) is to be cut has come to a predetermined position upstream of a fixed position (X) on said first support means and for determining when a second predetermined portion of the veneer at which its rear irregularly shaped end (8b) is to be cut has come to said predetermined position upstream of said fixed position (X), (d) means for stopping the veneer when said first predetermined portion of the veneer has reached said fixed position (X) and for stopping the veneer when said second predetermined portion of the veneer has reached said fixed position (X), (e) a cutter (2) for cutting the opposed irregularly shaped ends (8a, 8b) of the veneer (8) when the veneer (8) is being supported on said first support means, thereby producing opposed inclined end faces of the veneer, said cutter (2) being movable between a first position and a second position including said fixed position (X), said cutter (2) being moved to said second position when said first predetermined portion of the veneer is in said fixed position (X) and when said second predetermined portion of the veneer is in said fixed position (X), thereby cutting the irregularly shaped ends (8a, 8b) of the veneer, (f) a second support means (3) for supporting the veneer (8) after its front irregularly shaped end (8a) has been cut to form an inclined front end face (19) and this front end face (19) has been bonded to an inclined rear end face (24) of a preceding veneer (18) on said second support means, said second support means (3) pivotable to bring the inclined rear end face (24) of the veneer (18) on said second support means (3) into contact with the inclined front end face (19) of the veneer (8) on said first support means, (g) a veneer holder (5) provided in conjunction with said second support means (3) for pressing a rear end portion of the veneer (18) on said second support means (3) to hold and support the veneer (18) together with said second support means (3), and (h) at least one fixed adhesive-material supply means (9) with plural outlets (9a) from which is projected a sufficient amount of adhesive material (20) to bond together the inclined rear end face (18) of the veneer (18) on said second support means (3) and the inclined front end face (19) of the veneer (8) on said first support means, said outlets (9a) being spaced apart from each other in a direction perpendicular to the direction of conveyance of veneer (8), wherein, (i) said cutter (2) produces an end face of a veneer inclining from an upper edge (21) to a lower edge (22) a little ahead of said upper edge (21), and (ii) and outlets (9a) are located substantially directly aove, and in immediate proximity to, said fixed position (X) so that, when said second support means (3) makes a pivotal movement, the inclined rear end face (24) of the veneer (18) thereon picks off the adhesive material (20) projected from said outlets (9*a*) immediately before coming into contact with the front end face (19) of the veneer (8) on said first support means.

2. Apparatus in accordance with claim 1 wherein said first support means (1) is rotatable and conveys the veneer (8) together with said conveying means (12) and provides a surface with which the tip of said cutter (2) engages when said cutter (2) has cut into the veneer and whenever said cutter (2) is located in a plane which passes said fixed position (X) and makes a given angle ($\theta$) with a plane (Z) extending from a center of said first support means (1) and passing said fixed position (X).

3. Apparatus in accordance with claim 2 wherein said given angle ($\theta$) is 5 to 30 degrees.

4. Apparatus in accordance with claim 1 wherein said first support means (31) is fixed and has (a) a keen edge (26) located such that the keen edge (26) is engaged by the tip of said cutter (2) and thus cuts an irregularly shaped end of the veneer in cooperation with said cutter (2) when said cutter (2) is moved to said second position and (b) an inclined face (27) extending downwardly from the keen edge (26) for a given distance and wherein said cutter (2) is located in virtually the same plane as the inclined face (27) such that following the cutting of the irregularly shaped end, said cutter (2) advances into a space on the inclined face (27).

5. Apparatus in accordance with claim 2 wherein said second support means (3) includes plural veneer supporting members spaced apart from each other in a direction perpendicular to the direction of conveyance of the veneer and wherein said first support means (1) has plural circumferential recesses (1*a*) located at the same intervals as said veneer supporting members, whereby one end (25) of each of said veneer supporting member moves into an associated recess (1*a*) when the veneer supporting members make a pivotal movement.

6. Apparatus of claim including more than one adhesive-material supply means (9) and wherein each of the adhesive-material supply means (9) is provided with one outlet (9*a*).

* * * * *

UNITED STATES PATENT AND TRADEMARK OFFICE

CERTIFICATE OF CORRECTION

PATENT NO. : 5,185,050

DATED : February 9, 1993

INVENTOR(S) : Shinichi Sakamoto et al.

It is certified that error appears in the above-identified patent and that said Letters Patent is hereby corrected as shown below:

In column 4, line 40, after "angle" change "♭" to -- θ --.

<u>In the claims</u>:

In column 8, claim 1, line 67, change "aove" to -- above --.

In column 9, claim 2, line 12, change "whenever" to -- wherein --.

In column 10, claim 6, line 20, between "claim" and "including", insert -- 1 --.

Signed and Sealed this

Seventh Day of December, 1993

*Attest:*

BRUCE LEHMAN

*Attesting Officer*

*Commissioner of Patents and Trademarks*